United States Patent [19]

Ducanis

[11] 4,030,585

[45] June 21, 1977

[54] BAR STOCK GUIDE ARRANGEMENT FOR SCREW MACHINES

[76] Inventor: Paul Ducanis, 17401 NW. 2nd Ave., Miami, Fla. 33169

[22] Filed: Oct. 10, 1976

[21] Appl. No.: 728,546

[52] U.S. Cl. .................................. 193/38; 82/38 A
[51] Int. Cl.² ...................... B23B 25/00; B23Q 3/00
[58] Field of Search .......... 193/38; 82/38 A, 38 R; 308/3 A, 6 A, 6 R, 6 B; 214/1.1–1.5, 338, 339

[56] References Cited

UNITED STATES PATENTS

| | | | |
|---|---|---|---|
| 1,506,107 | 8/1924 | Brophy | 82/38 A |
| 1,506,108 | 8/1924 | Brophy | 82/38 A |
| 1,786,876 | 12/1930 | Tessky | 193/38 |
| 1,935,999 | 11/1933 | Tessky | 193/38 |
| 3,693,810 | 9/1972 | Gumhold | 193/38 |
| 3,828,630 | 8/1974 | Argereu | 214/1.5 |
| 3,918,696 | 11/1975 | Jameson | 193/38 |
| 3,930,568 | 1/1976 | Levey | 193/38 |
| 4,000,797 | 1/1977 | Ducanis | 193/38 |

*Primary Examiner*—Evon C. Blunk
*Assistant Examiner*—Jeffrey V. Nase
*Attorney, Agent, or Firm*—Oltman and Flynn

[57] ABSTRACT

In this apparatus rotatable, annular guide fittings receive the bar stock at support standards which are spaced apart in succession along the path of the bar stock at the inlet side of a screw machine. Each fitting contains spring-biased rollers which guide the bar stock between them and yieldably restrain it against vibrating transversely. The bar stock is unconfined except in the spaced-apart fittings. For a multiple screw machine, each support standard has a rotatively indexed cross plate carrying several such fittings, one for each bar stock.

17 Claims, 10 Drawing Figures

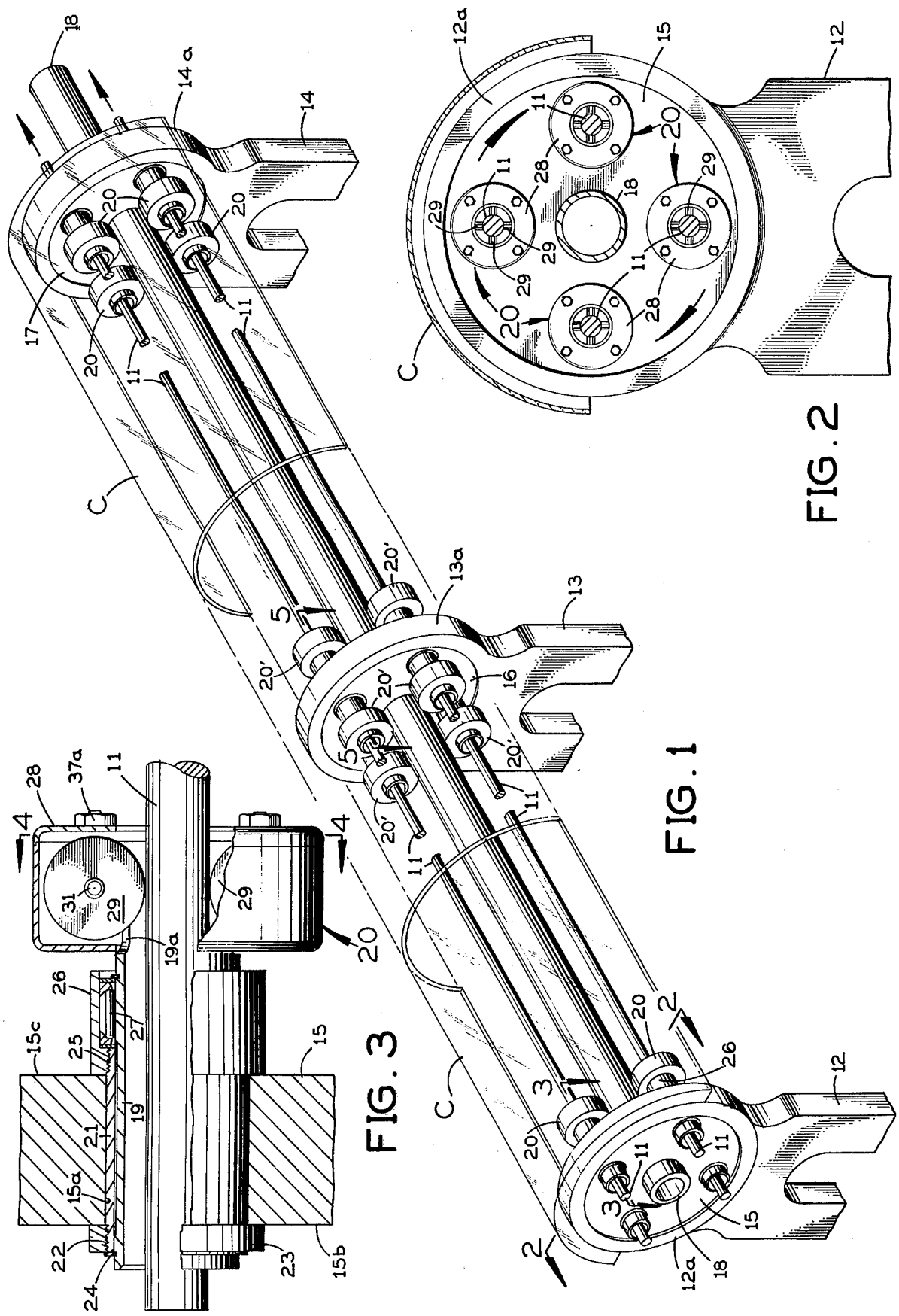

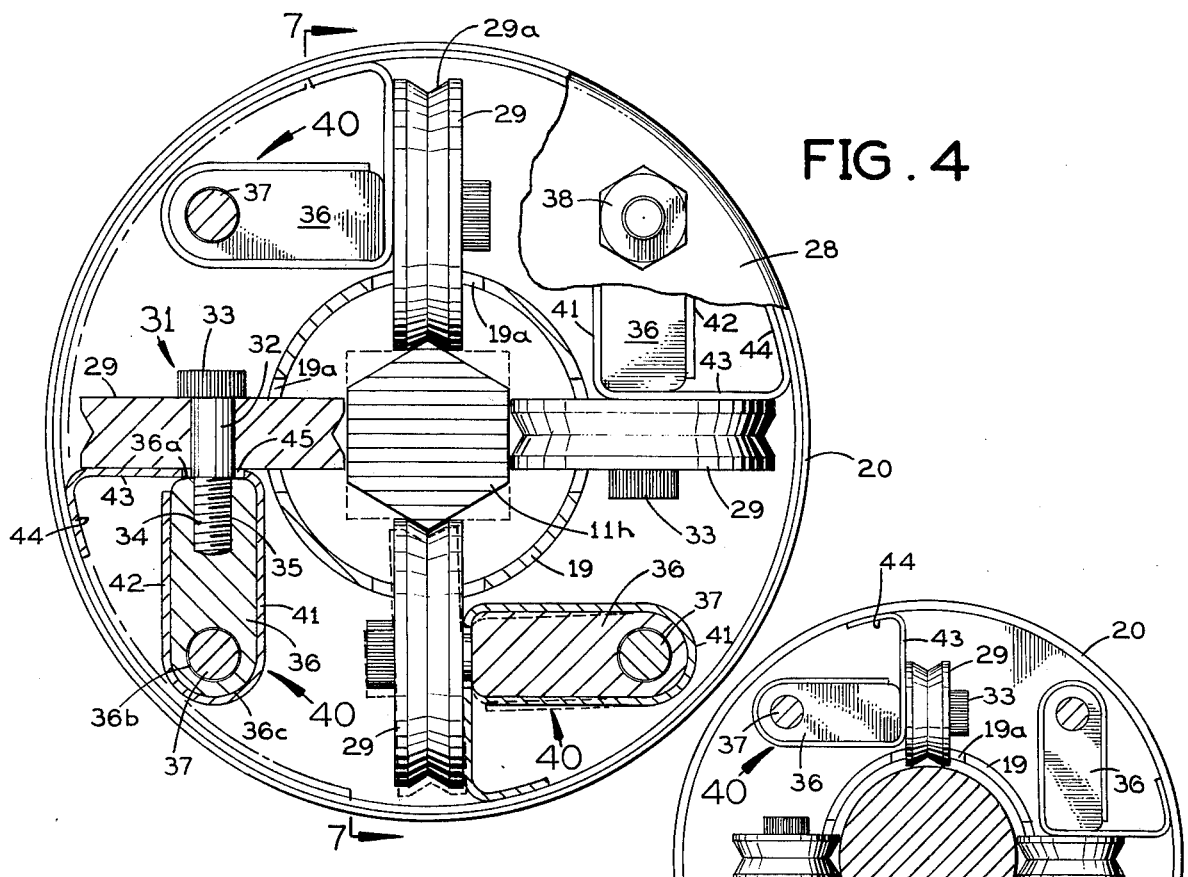
FIG. 4
FIG. 6
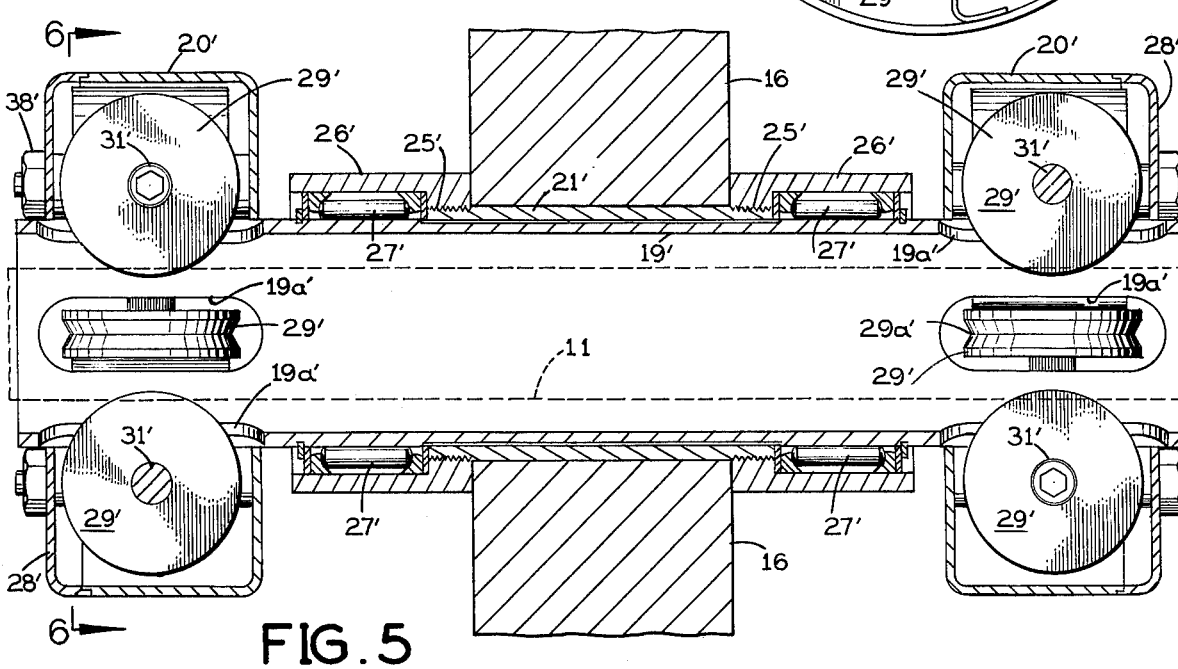
FIG. 5

BAR STOCK GUIDE ARRANGEMENT FOR SCREW MACHINES

BACKGROUND OF THE INVENTION

In the operation of screw machines of known design, the bar stock has been fed into the machine in long lengths and has had a very considerable tendency to vibrate transverse to its length. Usually the rotating bar stock was passed through an elongated guide tube held stationary at the inlet side of the screw machine. The rotating bar stock has a loose fit inside the non-rotating guide tube and it is free to vibrate transversely, striking the tube and thereby causing appreciable noise and often damaging the stock itself, particularly if it is of hexagonal or other polygonal, sharp cornered cross-section. Excessive noise in a machine shop is an occupational hazard which can be damaging to the safety, health and well-being of workers there, and it is contrary to federal policy, as expressed in the Occupational Safety and Health Act.

Various proposals for solving the noise problem, as disclosed in U.S. Pat. Nos. 1,506,107 annd 1,506,108, 3,828,630 and 1,935,999 have included the use of mineral wool packing or the like inside the guide tube, rotatable bushings of leather, fiber, polyurethane or other suitable material inside the guide tube, and a metal coil inside the guide tube. Also, U.S. Pat. No. 3,785,468 provides circumferentially spaced metal rollers, mounted on right-angled metal brackets, for guiding bar stock inside a guide tube.

My U.S. patent application Ser. No. 582,678, filed June 2, 1975, now U.S. Pat. No. 4,000,797, discloses several novel arrangements for solving this problem.

SUMMARY OF THE INVENTION

The present invention is directed to a novel bar stock guide arrangement for screw machines in which the usual continuous guide tube is eliminated. Instead, a novel fitting is provided at each of the usual cross plates which are spaced apart at intervals along the path of the bar stock at the inlet side of the screw machine. Each of these fittings provides circumferentially spaced guide members, preferably grooved rollers, which engage the bar stock on one side or on opposite sides of the cross plate and are free to revolve in unison with the bar stock when the latter is rotated by the screw machine. The bar stock need not be completely enclosed or confined throughout the relatively long intervals of its length between the fittings at successive cross plates at the inlet side of the machine and therefore the usual guide tube may be omitted.

The bar stock guide members in each fitting are spring-mounted in a novel manner to yieldingly restrain the bar stock against vibrating transversely.

Preferably, the present bar stock guide arrangement is provided in a multiple array capable of handling several stock bars extending parallel to each other and rotatively indexed to succession into alignment with the chuck of the screw machine, so that one stock bar at a time is positioned to be fed into the machine.

With the present arrangement the problem of excessive noise is eliminated and at the same time the bar stock is properly supported and guided in alignment with the chuck of the screw machine. In addition, the present arrangement:

1. reduces the wear on the spindle bearings, collet, collet tube, pushers, feed tubes and stock feeding mechanism of the screw machine;
2. reduces the wear on and damage to the bar stock as it is advanced into the screw machine;
3. improves the feeding of the bar stock into the screw machine;
4. improves the accuracy with which the bar stock is machined in the screw machine; and
5. reduces chatter.

A principal object of this invention is to provide a novel and improved arrangement for guiding bar stock into a screw machine.

Another object of this invention is to provide such a bar stock guide arrangement which enables the previously used guide tubes to be eliminated.

Another object of this invention is to provide a novel bar stock guide arrangement which greatly reduces the noise occurring when bar stock is fed into a screw machine.

Another object of this invention is to provide a novel bar stock guide arrangement which minimizes transverse vibration of the bar stock and the damage to the bar stock and to various parts of the screw machine which would be caused by excessive vibrations.

Further objects and advantages of this invention will be apparent from the following detailed description of certain presently-preferred embodiments thereof, shown in the accompanying drawings in which:

FIG. 1 is a perspective view showing the bar stock guide arrangement of the present invention at the inlet side of a multiple screw machine;

FIG. 2 is a vertical cross-section taken along the line 2—2 in FIG. 1 just beyond the first cross plate in this bar stock guide arrangement;

FIG. 3 is a vertical longitudinal section through part of this cross plate and one of the present bar stock guide fittings carried by it;

FIG. 4 is an enlarged vertical cross sectional view taken along the line 4—4 in FIG. 3 and showing a set of the guide rollers in the first bar stock guide fitting engaging a hexagonal bar stock (full lines) or a square bar stock (phantom lines);

FIG. 5 is a longitudinal section taken along the line 5—5 in FIG. 1 through one of the present bar stock guide fittings in the second cross plate of the bar stock guide arrangement shown there;

FIG. 6 is a cross-section taken along the line 6—6 in FIG. 5 at one set of guide rollers in the fitting, shown engaging circular bar stock;

Figure 7:
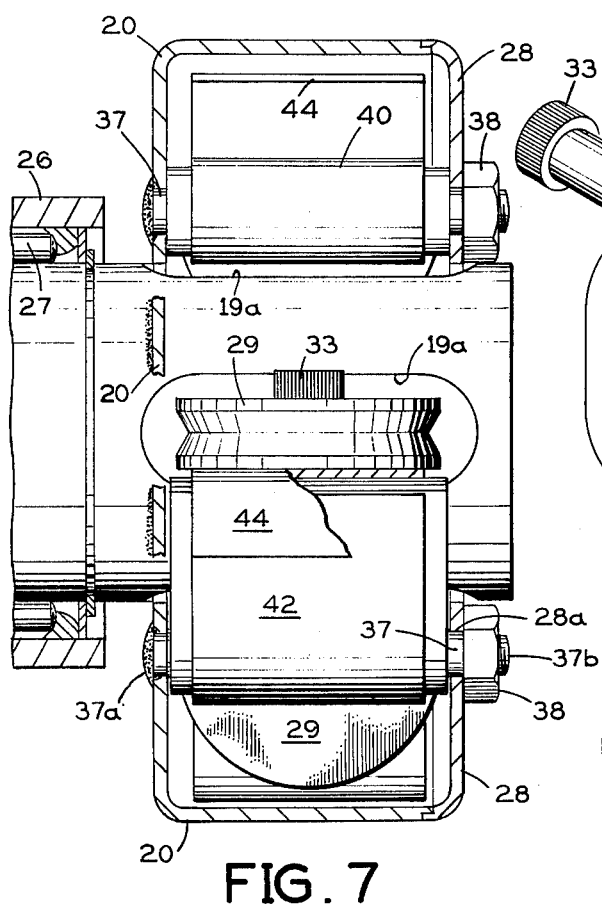
FIG. 7 is a longitudinal section taken along the line 7—7 in FIG. 4 and showing the guide roller and their individual supports in elevation.

Before explaining the disclosed embodiments of the invention in detail, it is to be understood that the invention is not limited in its application to the details of the particular arrangements shown, since the invention is capable of other structural embodiments. Also, the terminology used herein is for the purpose of description and not of limitation.

Referring first to FIG. 1, in a typical multiple screw machine (not shown), separate elongated bars of stock 11 extend parallel to each other at the inlet side of the screw machine. One bar 11 at a time is fed longitudinally into the screw machine and is rotated by the machine as it is screw-threaded in a known manner. Prior to the present invention, the common practice has been to provide a non-rotating guide tube for each bar 11 at the inlet side of the screw machine. The rotating bar stock would tend to vibrate transversely inside the non-rotating guide tube, producing excessive noise, sometimes damaging the bar stock, and tending to cause excessive wear on various parts of the screw machine.

In accordance with the present invention, rotatable, annular guide fittings are provided at suitable intervals along the length of each bar's travel at the inlet side of the screw machine. These guide fittings support and guide the bar, minimizing its tendency to vibrate transversely. Between successive guide fittings the bar is unconfined, there being no need for the usual guide tube of the prior art.

As shown in FIG. 1, three support standards 12, 13 and 14 are located in succession at suitable intervals along the path of the bar stock at the inlet side of the screw machine. It is to be understood that a greater or smaller number of such standards may be provided, as desired, extending up from the floor of the machine shop. The standards have respective rings 12a, 13a and 14a at their upper ends which rotatably receive and support corresponding rigid cross plates 15, 16 and 17 of circular outline. The cross plates are attached to a central shaft 18 which extends coaxially through the rings 12a, 13a and 14a. This shaft is arranged to be turned through successive quarter-turns so as to rotatively index the cross plates 15, 16 and 17 simultaneously as one bar 1 is used up in the screw machine and the next one is to be used.

Four identical annular fittings in accordance with the present invention are mounted in the first cross plate 15 at 90° intervals circumferentially. FIG. 3 shows one of these fittings in longitudinal section. This fitting has a rotatable, cylindrical inner sleeve 19 extending axially through the cross plate 15 and welded or otherwise rigidly connected to a flanged annular housing 20 at the inner side (the side toward the screw machine) of cross plate 15. The bar stock 11 passes loosely through the inner sleeve 19 and housing 20.

This fitting is rotatably mounted in its cross plate by a cylindrical outer sleeve 21 which extends snugly through a corresponding opening 15a in the cross plate 15. The outer sleeve is clamped to the cross plate at each end and loosely passes the inner sleeve 19. At its outer end beyond the cross plate 15, the outer sleeve 21 is externally screw-threaded at 22, and a nut 23 threadedly engages it there and abuts axially against the outer end face 15b of this cross plate. A C-washer or snap ring 24 is seated in an external circumferential groove in the inner sleeve 19 just beyond the outer end of the outer sleeve 21 to hold the latter and the nut 23 axially in place, with the nut abutting against the cross plate 15, as shown in FIG. 3.

The opposite, inner end of the outer sleeve 21 (i.e., the end toward the screw machine) is externally screw-threaded at 25 just beyond the inner end face 15c of the cross plate 15. An annular outer bearing race 26 has an internally screw-threaded, flanged inner end which threadedly engages the screw threads 25 on the outer sleeve and abuts axially against the inner end face 15c of the cross plate 15. The outer bearing race 26 extends circumferentially around a plurality of needle bearing elements 27, which are held in rolling engagement with the outer periphery of the inner sleeve 19 to support the latter for rotation inside the outer sleeve 21 and the cross plate 15 which receives that fitting. Thus, the outer sleeve 21 and the anti-friction bearing 26, 27 constitute means rotatably mounting the corresponding fitting at the opening in the cross plate.

A flat, annular end plate 28 is bolted to the inner end of the annular housing 20 (toward the screw machine) to enclose an annular space around the bar stock 11 passing loosely through the inner sleeve 19 and housing 20. Referring to FIG. 4, four grooved rollers 29 are positioned inside the housing 20 at 90° intervals circumferentially around the periphery of the bar stock, which is shown in full lines as having a hexagonal cross-section and is designated by the reference numeral 11h in this Figure. The four rollers are rotatably mounted at the outside of the inner sleeve 19 and they extend through respective longitudinal, circumferentially spaced slots 19a in the inner sleeve into rolling engagement with the bar stock 11h.

The four rollers 29 are identical and they are identically mounted, so the detailed description of one will suffice to describe all of them.

Figure 8:
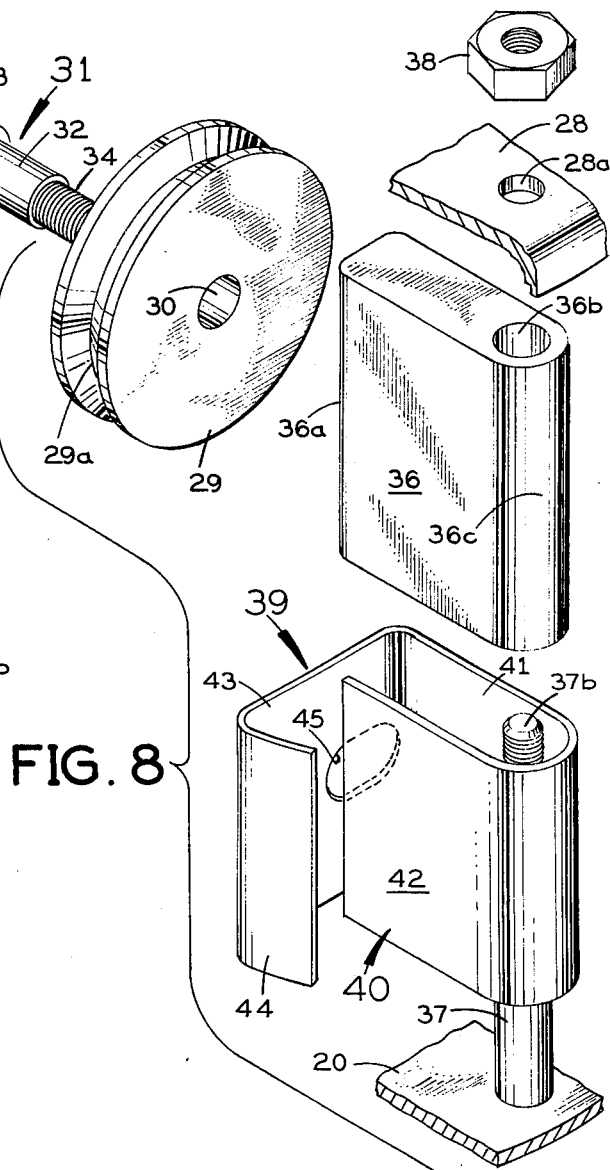
FIG. 8 is an exploded perspective view of one of the guide rollers and its support in the present fitting.

Referring to FIGS. 4 and 8, each roller 29 has a central axial opening 30. A mounting bolt 31 for the roller presents a smooth cylindrical shank segment 32 which passes through the opening 30 in the roller. An enlarged transverse head 33 on the bolt abuts against one end face of the roller 29. The opposite end of the bolt is screw-threaded at 34 and is threadedly received in a complementary screw-threaded recess 35 formed in a rigid mounting plate 36 (FIG. 4). Each roller 29 is rotatably supported on the corresponding mounting plate 36 by its bolt 31, with one axial end face of the roller closely spaced from the adjacent end face 36a of the mounting plate, as shown in FIG. 4.

The mounting plate 36 is pivotally supported by a corresponding bolt 37, which extends parallel on the axis of the inner sleeve 19 of the fitting at a location radially outward from the latter. The bolt 37 extends through a circular bore 36b in the mounting plate near the latter's rounded end face 36c away from the corresponding roller 29. Each bolt 37 at one end is welded to the end wall of the annular housing 20, as shown at 37a in FIG. 7. Toward its opposite end the bolt 37 extends through a corresponding opening 28a in the housing end plate 28. Beyond this end plate the bolt 37 is screw-threaded at 37b and there it threadedly receives a nut 38, which abuts against the outside of the housing end plate 28, as shown in FIG. 7.

A leaf spring 39, having the configuration shown in FIG. 8, embraces the mounting plate 36 and biases the roller 29 radially inward. This spring has a generally U-shaped segment 40 which snugly receives the pivoted mounting plate 36 between the opposite, flat, inner and outer legs 41 and 42 of the "U". The spring has a generally L-shaped segment, which includes a transverse leg 43 connected at its inner end to the free end of the inner leg 41 of the U and a curved shorter leg 44 connected to the outer end of the transverse leg 43 and slidably engaging the inside of the cylindrical sidewall of the housing 20 radially outward beyond the outer leg 42 of the U, as shown in FIG. 4. The transverse leg 43 of the L-shaped segment of the spring extends between the end face 36a of the mounting plate 36 and the adjacent end face of the roller 29, abutting against the latter as shown in FIG. 4.

The transverse leg 43 of the spring 40 has an oblong opening 45 (FIG. 8) which passes the mounting bolt 31 for the roller 29 and permits the mounting plate 36 for the roller to rock pivotally about its pivot bolt 37.

With this arrangement, normally each spring 39 biases the corresponding mounting plate 36 and roller 29 and associated parts to the full-line position shown in FIG. 4, with the roller extending radially with respect to the bar stock and projecting into the longitudinal passageway for the bar stock for rolling engagement with the bar stock. In the event that the bar stock vibrates transversely outward, each roller 29 can move outward from its full-line position, causing its mounting plate 36 to pivot about its mounting bolt 37 against the bias of its spring 39 to a position as shown in phantom in FIG. 4. Consequently, the spring 39 will be flexed and the resulting internal stress in the spring will cause it to return the parts to the full-line position as soon as the transverse force exerted on the roller by the bar stock is relieved. Stated another way, each spring 39 yieldingly opposes the outward displacement of the corresponding roller 29 in response to transverse vibration of the bar stock.

Figure 9:
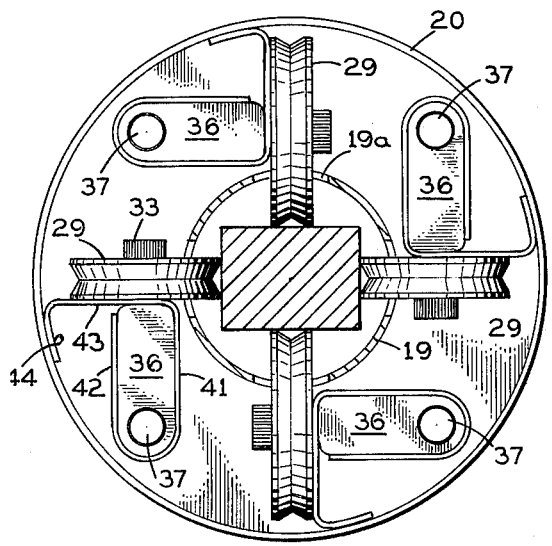
FIG. 9 is a view similar to FIG. 6, but with the four guide rollers engaging rectangular bar stock.

Preferably, as shown, each roller is formed with a peripheral, circumferentially extending groove 29a of generally V-shaped cross-section. When the bar stock is hexagonal, as shown in full lines in FIG. 4, the grooves on two of the rollers snugly engage opposite corners of the bar stock. When the bar stock is of square cross-section (phantom lines in FIG. 4), or round cross-section (FIG. 6), or oblong rectangular cross-section (FIG. 9), the roller engages the bar stock at the cylindrical periphery of the roller on opposite sides of its V-groove 29a.

The bar stock guide fittings at the final cross plate 17 (closest to the screw machine) are mirror images of the just-described fittings at the first cross plate 15 and will not be described in detail. As shown in FIG. 1, the housing 20 of each of these fittings is located at the inlet side of the cross plate 17, rather than at the outlet side, as with the cross plate 15. Each of these housings encloses the bar stock-engaging guide rollers 29, which are arranged as already described in detail with reference to FIGS. 3, 4, 7 and 8.

The middle cross plate 16 supports a fitting which provides rollers and is supported by anti-friction bearings on both sides of the cross plate instead of one side only. This fitting is shown in longitudinal section in FIG. 5, and corresponding elements of it are given the same reference numerals as used previously, but with a "prime" suffix added. Each roller housing 20' is welded to the inner sleeve 19' and each supports a set of four guide rollers 29', which are resiliently yieldably mounted as already described in detail.

In the operation of the complete apparatus (FIG. 1) the central shaft 18 is turned to position a selected bar stock 11 in alignment with the chuck of the screw machine. Each time this shaft 18 is rotatively indexed through a quarter-turn the cross plates 15, 16 and 17 turn in unison with it. As the selected bar stock 11 is rotated by the chuck of the screw machine the inner sleeve 19, housing 20 and rollers 29 of each fitting revolve in unison with the bar stock while the outer sleeve 21 remains stationary in the respective cross plate 15, 16 or 17. As the bar stock is advanced axially into the screw machine (while continuing to rotate), it is engaged tangentially by the rollers 29, causing the rollers to rotate of their respective pivots 31 inside the revolving housing 20 of the corresponding fitting. The rollers in each fitting guide the bar stock longitudinally and resiliently restrain it against vibrating transversely, as already explained.

The present guide arrangement minimizes noise by eliminating the usual guide tubes for the bar stock. The bar stock is not enclosed except in the guide fittings and, as explained, these fittings restrain it against transverse vibration in an effective manner.

If desired, however, the usual guide tubes (not shown) may be provided, extending between the successive fittings to enclose the bar stock.

As shown in FIG. 1, a downwardly-facing semicylindrical cover C, preferably of transparent plastic, such as "Plexiglas", may extend over the length of the apparatus at the inlet side of the screw machine. This cover may fit snugly over the top of the rings 12a, 13a and 14a on the successive upstanding supports 12, 13 and 14.

Figure 10:
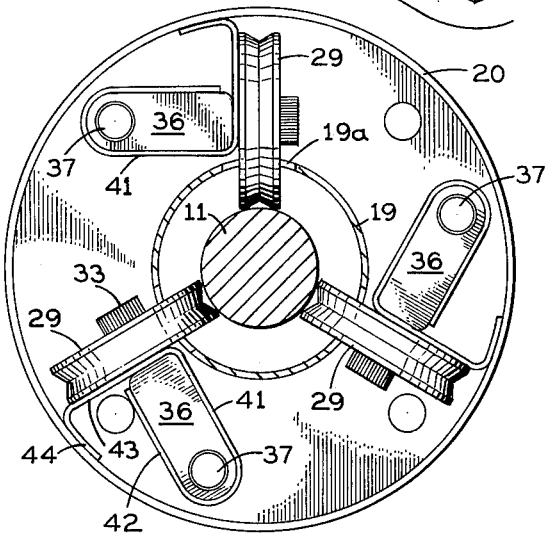
FIG. 10 is a view similar to FIG. 6 of a modified arrangement having three guide rollers (instead of four) engaging the bar stock.

As shown in FIG. 10, one, several or all of the guide fittings may have three (instead of four) stock-engaging rollers, if desired. Alternatively, five or more rollers may be provided in the fittings, if desired. In each case, the rollers in each set preferably are evenly spaced circumferentially.

Also, it is to be understood that the present invention may be used where only a single bar stock is fed into the machine and there is no need to rotatively index it into alignment with the chuck of the screw machine.

I claim:

1. In a bar stock guide arrangement at the inlet side of a screw machine, said guide arrangement comprising rigid cross plates spaced apart at intervals along the path of the bar stock at the inlet side of the screw machine and having substantially horizontal openings therethrough for passing the bar stock, the improvement which comprises:
    an annular fitting defining a longitudinal passageway for the bar stock;
    a plurality of guide members mounted in each fitting at circumferentially spaced locations around said longitudinal passageway for the bar stock;
    spring means in each fitting resiliently biasing said guide member inward toward said longitudinal passageway for engagement with the bar stock to restrain it against vibrating transversely; and
    means rotatably mounting each fitting in each cross plate at said opening therein for permitting the fitting to rotate in unison with the bar stock when the bar stock is rotated by the screw machine.

2. A bar stock guide arrangement according to claim 1, wherein said fittings and guide members constitute the sole means confining and guiding the bar stock as it travels between successive cross plates to the screw machine.

3. A bar stock guide arrangement according to claim 1, wherein said guide members are rollers rotatably mounted in said fitting at circumferentially spaced locations around said longitudinal passageway for the bar stock, and said spring means bias said rollers inward for rolling engagement with the bar stock.

4. A bar stock guide arrangement according to claim 3, wherein each means rotatably mounting each fitting comprises:

an outer sleeve clamped to the corresonding cross plate at said opening therein;

and anti-friction bearing means supporting an inner sleeve with respect to the outer sleeve;

and wherein each of said fittings comprises:

the inner sleeve rotatable inside the outer sleeve;

and an annular housing rigidly attached to said inner sleeve at one axial side of the corresponding cross plate, said rollers being mounted inside said annular housing.

5. A bar stock guide arrangement according to claim 4, wherein said anti-friction bearing means is positioned between said annular housing and the adjacent of the corresponding cross plate.

6. A bar stock guide arrangement according to claim 4, wherein at least one of said fittings has two of said annular housing respectively attached rigidly to said inner sleeve on oppostie axial sides of the corresponding cross plate, and each of said two housing contains rollers for engaging the bar stock.

7. A bar stock guide arrangement according to claim 6, wherein said bearing means comprises two anti-friction bearings located respectively between said annular housings and the adjacent sides of the corrresponding cross plate.

8. A bar stock feeding arrangement according to claim 3, wherein each of said fittings has an annular housing surrounding the rollers therein, and further comprising:

a respective mounting plate rotatably supporting each roller and extending at one axial side of the corresponding roller inside the respective annular housing;

and means providing a pivotal support for each mounting plate which is spaced from the respective roller at said one axial side thereof and extends parallel to said longitudinal passageway for the bar stock;

and wherein:

said spring means comprises a spring acting between said housing and each mounting plate to resiliently bias the latter pivotally to a position holding the corresponding roller radially inward.

9. A bar stock feeding arrangement according to claim 8, wherein each spring is a leaf spring having:

a generally U-shaped segment embracing the respective mounting plate and comprising outer and inner legs engaging opposite sides of the mounting plate and a curved portion joining said legs and extending around the pivotal support for the mounting plate;

and a generally L-shaped segment having a transverse leg connected at one end to the free end of the inner leg of said U-shaped segment and extending substantially radially outward therefrom, and an outer leg connected to the opposite end of said transverse leg and slidably engaging the inside of said annular housing, said transverse leg extending between the roller and the adjacent end face of the mounting plate.

10. A bar stock guide arrangement according to claim 9, wherein each means rotatably mounting each fitting comprises:

an outer sleeve clamped to the corresponding cross plate at said opening therein;

and anti-friction bearing means supporting an inner sleeve for rotation with respect to the outer sleeve;

and wherein each of said fittings comprises:

the inner sleeve rotatable inside the outer sleeve and rigidly attached to said annular housing at one side of the corresponding cross plate.

11. A bar stock guide arrangement according to claim 10, wherein said anti-friction bearing means is positioned between said annular housing and the adjacent side of the corresponding cross plate.

12. A bar stock guide arrangement according to claim 10, wherein at least one of said fittings has two of said annular housings respectively attached rigidly to said inner sleeve on opposite axial sides of the corresponding cross plate, each of said two housings containing rollers for engaging the bar stock.

13. A bar stock guide arrangement according to claim 12, wherein said bearing means comprises two anti-friction bearings located respectively between said annular housings and the adjacent sides of the corresponding cross plate.

14. A bar stock guide arrangment according to claim 3, and further comprising:

a plurality of upstanding supports spaced apart at said intervals and individually supporting said cross plates for rotational adjustment of the latter;

and a plurality of said fittings in each cross plate at different angular positions equidistant radially outward from the latter's axis of rotation in the corresonding upstanding support for alignment of said fittings selectively with the screw machine inlet when the cross plates are adjusted rotatably.

15. A bar stock guide arrangement according to claim 14, wherein each means rotatably mounting each fitting comprises:

an outer sleeve clamped to the corresponding cross plate at said opening therein;

and anti-friction bearing means supporting an inner sleeve for roatation with respect to the outer sleeve;

and wherein each of said fittings comprises:

the inner sleeve rotatable inside the outer sleeve;

and an annular housing rigidly attached to said inner sleeve at one axial side of the corresponding cross plate, said rollers being mounted inside said annular housing.

16. A bar stock feeding arrangement according to claim 15, wherein each of said fitting has an annular housing surrounding the rollers therein, and further comprising:

a respective mounting plate rotatably supporting each roller and extending at one axial side of the corresponding roller inside the respective annular housing;

and means providing a pivotal support for each mounting plate which is spaced from the respective roller at said one axial side thereof and extends parallel to said longitudinal passageway for the bar stock;

and wherein:

each spring acts between said housing and the mounting plate for the corresponding roller to resiliently bias said mounting plate pivotally to a position holding the corresponding roller radially inward.

17. A bar stock feeding arrangement according to claim 16, wherein each spring is a leaf spring having:

a generally U-shaped segment embracing the respective mounting plate and comprising outer and inner legs engaging opposite sides of the mounting plate and a curved portion joining said legs and extending around the pivotal support for the mounting plate;

and a generally L-shaped segment having a transverse leg connected at one end to the free end of the inner leg of said U-shaped segment and extending substantially radially outward therefrom, and an outer leg connected to the opposite end of said transverse leg and slidably engaging the inside of said annular housing, said transverse leg extending between the roller and the adjacent end face of the mounting plate.

* * * * *